July 30, 1929.   D. DESMOND   1,722,518

DISPLAY DEVICE

Filed July 5, 1927   2 Sheets-Sheet 1

Inventor

Daniel Desmond.

By Harry H. Styll.

Attorney

July 30, 1929.  D. DESMOND  1,722,518

DISPLAY DEVICE

Filed July 5, 1927  2 Sheets-Sheet 2

Inventor
Daniel Desmond.
By Harry H. Styll Attorney

Patented July 30, 1929.

1,722,518

UNITED STATES PATENT OFFICE.

DANIEL DESMOND, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

DISPLAY DEVICE.

Application filed July 5, 1927. Serial No. 203,423.

This invention relates to display devices and has particular reference to such a device for showing the relationship of the focal point of a ray of light entering the eye with respect to the retina of the eye for various angular positions of the human vision.

The principal object of the invention is to provide means for showing the relationship of the focal point of a ray of light entering the human eye with respect to the retina of the eye through the marginal and central portions of an ophthalmic lens in position before the eye.

Another object of the invention is to provide improved means for relating the movement of the focal point of a ray of light to the retina of the eye as the angular direction of the ray of light entering the eye is changed.

Another object of the invention is to provide improved means for illuminating the various angular positions of the ray of light and the effects obtaining at that position.

Another object of the invention is to provide improved means for changing the angular positions of the ray of light.

Another object of the invention is to provide improved lighting and switch means for alternatingly illuminating the various angular positions of the ray of light and the conditions there obtaining.

Another object of the invention is to provide means for comparing the eye conditions with various angular positions of a ray of light for a lens having marginal errors with one having no marginal errors.

Another object of the invention is to provide improved operating means that may be either manually operated or power operated to change the angular position of a ray of light.

Other objects and advantages of the invention will become apparent from the following description taken in connection with the accompanying drawings, and it will be apparent that many changes may be made in the arrangement of parts and details of construction without departing from the spirit of the invention as set forth in the accompanying claims. I, therefore, do not wish to be limited to the exact details of construction and arrangement of parts shown and described, the preferred forms only having been shown by way of illustration.

Referring to the accompanying drawings.

It is well known that the vision through the marginal portions of ophthalmic lenses is ordinarily different from that through the central portion of said lenses. This difference is due to the curvature of the refracting surface being greater along certain meridians than along others, as well as to errors of focus. It has been very difficult to demonstrate the effect of these marginal variations and it is the object of my invention to provide a display device that will show diagrammatically the relationship of the focal point of the light to the retina at particular marginal portions of an ophthalmic lens. It is also an object of my invention to illustrate thus diagrammatically these marginal defects as compared with a lens free from such marginal defects.

Figure 1:
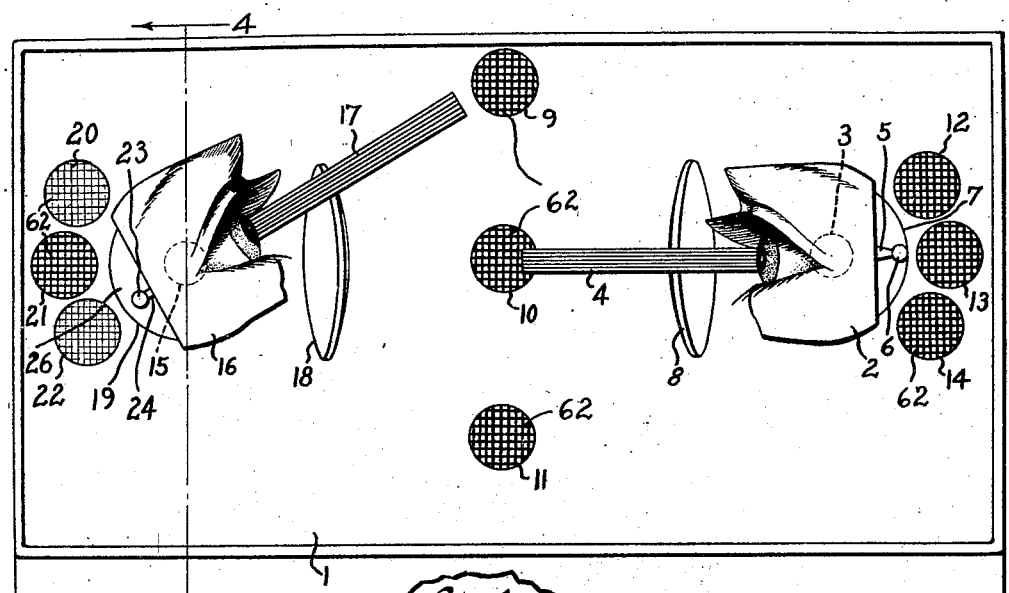
Fig. 1 is a front elevation of the device showing the comparative arrangement of the angular positions and the conditions obtaining in a lens having no marginal defects and one having marginal defects.

Referring to the drawing wherein similar parts are indicated by corresponding characters throughout, Fig. 1 shows in elevation the front or display plate 1 of my device. On the right hand side I have indicated a member 2 representing the eye, the said member being pivoted at 3. Extending from the member 2 inwardly of the front plate 1 is a member 4 representing the ray of light. This member 4 is a part of and moves with the member 2. On the opposite side and extending from the member 2 is a member 5 having a ball pointer 6 which represents the focal point of the ray of light 4. Beneath the member 2 and extending beyond the rear portion thereof is the line 7 representing the line of the retina of the eye. In front of the eye is a pictorial representation of a lens 8 which is positioned in correct wearing position with respect to the eye. In line with the outer end of the member 4 I have designated by cross lines three spots 9, 10 and 11, representing positions of the ray of light 4 as follows: The numeral 9 designates a marginal upper spot, the numeral 10 represents a central spot, and the numeral 11 represents the lower marginal spot. The spots 9, 10 and 11 thus represent the objects that are being looked at by the eye in these various positions. Behind the eye I have designated three other spots, namely, 12, 13 and 14, representing the vision that is seen by the eye when looking at the points 9, 10 or 11. The vision seen when looking at 11 is represented by 12, when looking at 10, by 13, and when looking at 9, by 14.

On the left hand side I have pivoted at 15 another member 16 representing the eye and having the projecting light ray portion 17 and in front of the eye I have indicated the lens 18 similar to the lens 8. Behind the eye I have also represented the line 19 of the retina and three vision spots 20, 21 and 22. The spot 22 shows the vision of the spot 9; 21 shows the vision of the spot 10; and 20 shows the vision of the spot 11. In this position the ball point 23 is separate from the member 16 and is secured to a separate member 24.

When the ray of light 4 on the right hand side is moved about the pivot 3 the pointer member 6 and the member 5 move with it, hence the pointer member 6 will travel on the line of the retina 7 and the vision indicating spots 12, 13 and 14 will all indicate the same vision, showing that there are no marginal errors in the lens 8. On the left hand side, however, the pointer member 23 does not only move with the portion 16 and the ray member 17 but is separated therefrom and also works on a slide. In this diagram the pointer member 23 does not follow the line of the retina, hence the vision at 20 and 22 will be different from the vision 21 as there are marginal errors in the lens 18.

The important factor of the diagrammatic representation on the plate 1 is the movement of the pointer 23 and the type of vision indicated by 20 and 22 as compared with 21. This relationship is shown diagrammatically in Fig. 2.

It will be noted that when the pointer member 23 is on the horizontal line the ray member 17 pointing to the spot 10 is tangent with the line 19 representing the retina of the eye, but that when the ray 17 has been moved in the direction of the spot 9 or in the direction of the spot 11 the pointer 23 does not fall on the line 19 but lies at a considerable distance towards the center 15 therefrom, whereas on the right hand side the pointer 6 falls on the line of the retina 7 when the ray member 4 is pointing at the spots 9, 10 and 11.

Figure 3:
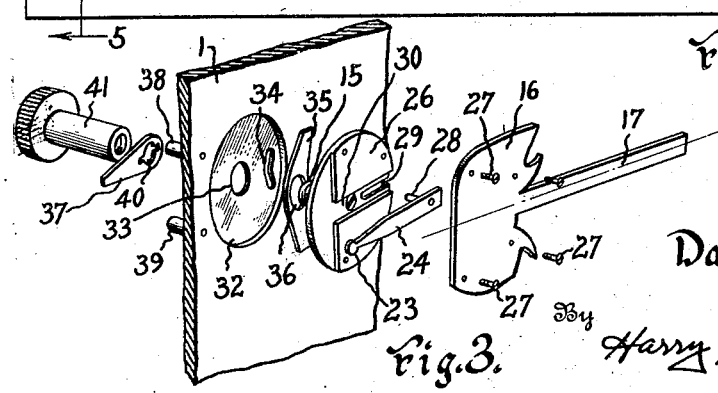
Fig. 3 is a partial perspective view showing the arrangement of the operating mechanism for moving the member indicating the ray of light and the focal point of said ray.
Figure 4:
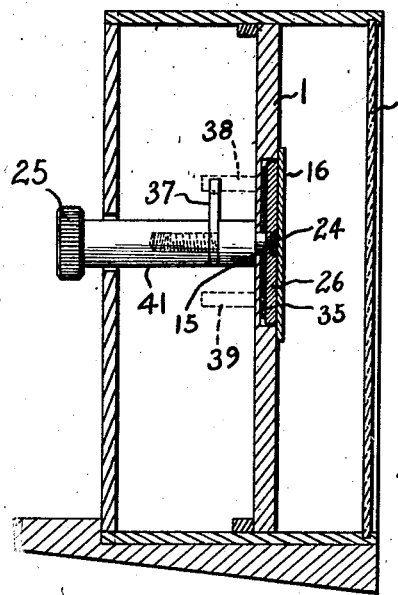
Fig. 4 is a cross section on line 4—4 of Fig. 1.

The ray member 4 on the right hand side is moved from 9 to 10 and from 10 to 11, etc., by means of a knurled turning member 25, as indicated in Fig. 4. It is simply turned back and forth to the various spots by rotating the turning member 25. There is no further mechanism necessary to illustrate the action or movement of the point 6 along the line of the retina 7. This is not true, however, of the device on the left hand side as there is a movement of the pointer 23 with respect to the retina line 19 and mechanism has to be provided to provide for this movement in the respective positions of the ray member 17, and this mechanism is shown in perspective in Fig. 3.

The eye member 16 having the ray portion 17 is fastened to a disc 26 by means of the screws 27 in such a position that the center line of the member 17 crosses the center point 15. The pointer 23 is on the member 24 which has a pin 28 fitting into a slot 29 in the disc 26 which is pivoted at 15. The disc 26 also has the slide way 30 for the reception of the member 24. In the supporting plate 1 is cut the circular recess 32 having the central opening 33 and a double cam slot 34. The plate or disc 26 fits into the recess 32 and has a friction spring 35 having the opening 36 lying between the bottom of the recess 32 and the disc 26. The pin 28 on the member 24 also fits into the double cam slot 34.

On the back of the disc 26 is the pivot member 15 which extends through the opening 33 in the plate 1. Secured to this pivot 15 is a stop member 37 adapted to engage the pins 38 and 39. The stop member 37 has an opening 40 through which the pivot member 15 projects and a knurled turn member 41 screws onto the pivot member 15.

Figure 2:
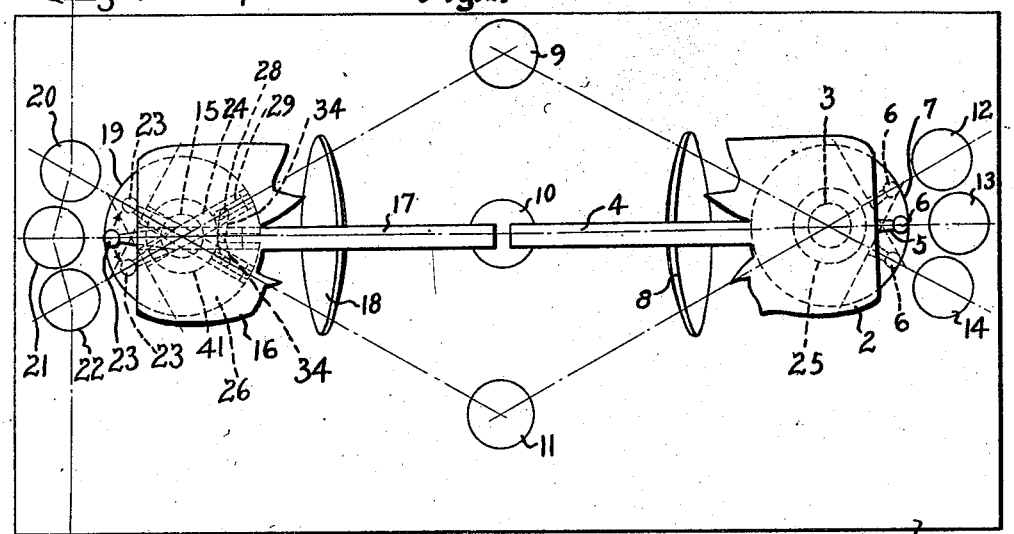
Fig. 2 is a diagrammatic view in elevation showing the relative positions of the focal point of a ray of light with respect to the retina of the eye.

The operation of the left hand side is as follows: The turn member 41 is moved until the lever member 37 contacts with one or other of the pins 38 and 39 which represent the extent of movement necessary to throw the ray of light in line with the spots 9, 10 or 11, as the case may be. When the turn member 41 is rotated it also turns the plate 26, the turning of which moves the pin 28 on the member 24 in the double cam slot 34 and thereby causes the member 24 to slide back and forth in the groove 30 in the plate 26. The pointer 23 on the member 24, therefore, travels back and forth as regulated by the pin 28 in the double cam slot 34. When it is in central position with the member 17 pointing to the spot 10, the pointer 23 will lie on the line of the retina 19. When the member 17 is pointed to the spots 9 or 11 the pointer 23 will lie inwardly from the retina line 19 as indicated in Fig. 2. It will be seen, therefore, that by rotation of the turn member 41 the relationship between the pointer 23 indicating the focal point of the ray and the retina line will be determined.

Figure 5:
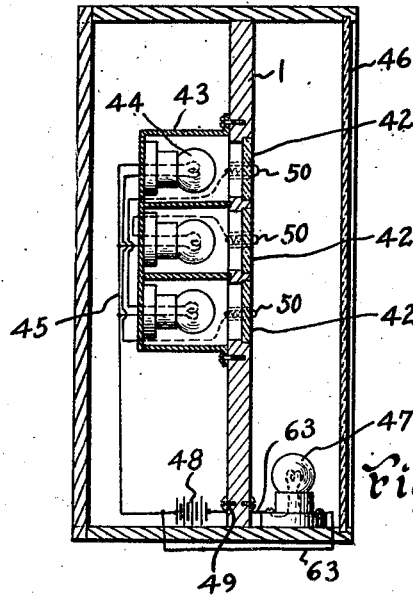
Fig. 5 is a cross section on line 5—5 of Fig. 2.
Figure 6:
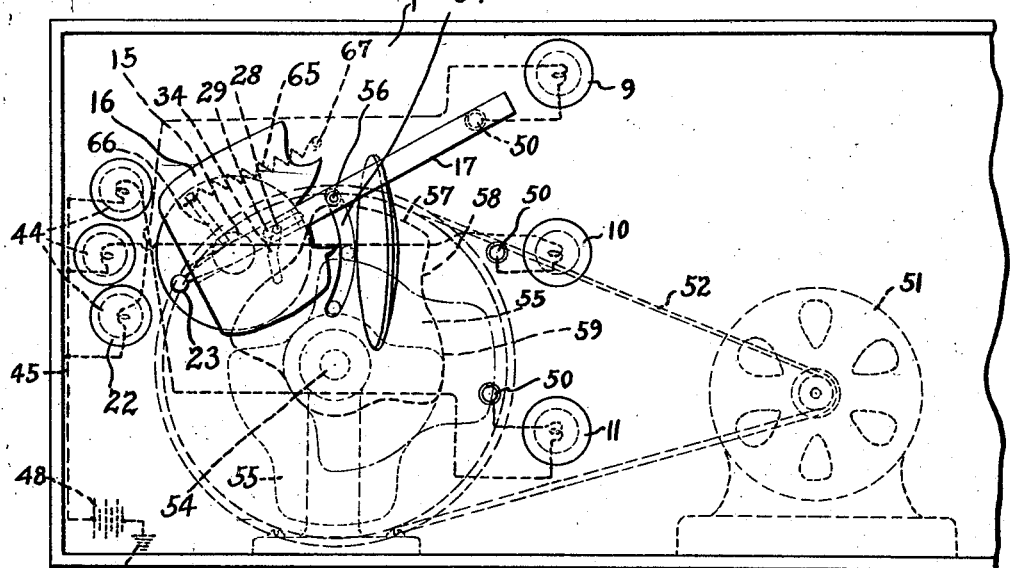
Fig. 6 is an elevation showing the operating mechanism.

If it is desired to illuminate the spots 9, 10, 11, 12, 13, 14, 20, 21 and 22, the indication lines 62 of the spots may be placed on a glass disc or the like 42, see Fig. 5, and a subdivided casing 43 placed thereover, each casing containing an electric light bulb 44 and the casing lead wires 45. If desired also the front plate 1 may be covered by a glass or transparent cover plate 46 and the face of the plate 1 illuminated by an electric bulb 47 connected with the electric leads 63. The lights 44 are operated by switch means 50 so that when the member 17 points to the spot 9, the spots 9 and 22 will be illuminated; when it points to the spot 10, the spots 10 and 21 will be illuminated; when it points to the spot 11, the spots 11 and 20 will be illuminated. When the ray member 4 is pointing at 9 the spots 9 and 14 will be illuminated; when it is pointing at 10 the spots 10 and 13 will be illuminated, and when it is pointing at 11 the spots 11 and 12 will be illuminated. The electric means for operating these lights is as follows: The lead wires 45 are connected with a source of power 48, such as a battery and the opposite connection of the battery is grounded at 49 to the metallic plate 1. The lead wires 45 are connected with one filament lead of the illuminating members 44 and the other lead from the filament is connected to an insulated spring pressed switch point 50 which is positioned in and projects beyond the outer surface of the plate member 1. By reference to Fig. 6 it will be seen that when the ray member 17 points towards the spot 9 it will contact with the switch point 50 and will thereby close the circuit between the source of electric energy 48 and the switch point 50 to illuminate the spots 9 and 22, the plate member 1 and the light ray member 17 acting as a lead for one circuit of the electrical energy and the lead wires 45 the other. The operation for the points 10 and 21 and for the points 11 and 20 is identical. In other words, when the ray member 17 points at any particular spot that spot and the corresponding spot showing the type of vision at that point will be illuminated and, as stated, the front of the plate 1 may be directly illuminated by the lamp 47. It is also understood that the source of electric current 48 may be a battery or any direct connection with an electrical current.

Figure 7:
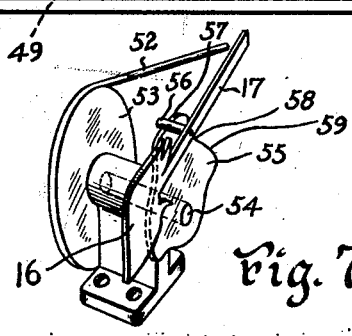
Fig. 7 is a partial perspective view showing the driving mechanism and the cam for operating the member representing the focal point.

If desired to operate the ray member 17 by power means instead of by the turn member 41 the member 17 may be connected with a source of power, such as a motor 51, connected by a belt 52 running over a pulley 53. Fig. 7 shows the means by which this is carried out. The pulley 53 is on a shaft 54 on which is mounted a cam plate 55 which contacts with a pin 56 on the member 17. The pin 56 extends through the arcuate slot 64 in the plate 1. The outline of this cam 55 is shown in dotted lines in Fig. 6 and is such that when the ray member 17 is pointing to the spot 9 the pin 56 will ride on the surface or dwell 57 of the cam 55 so that the ray member 17 will continue to point at 9. In other words, the section 57 of the cam is what may be termed a dwell section. After the ray member 17 has remained pointing to the spot 9 for a determined time the pin 56 drops down in a cut away portion 58 of the cam until the ray member 17 points to the spot 10 where it enters on another dwell section 59, allowing it to remain on the point 10 for the required time of the dwell and then drops off again to another cut away portion of the cam allowing the lever to descend to the spot 11, after which the action is reversed carrying the ray member 17 to the point 10 and to the point 9, and so on. A suitable spring 65 is connected at one end to the pin 66 mounted on the pivot 15 and at the opposite end 67 to the plate 1 and tends to urge the cam follower pin 56 in constant engagement with the cam 55. This allows the ray member 17 to point for fixed times at the illuminated spots and provides a continuous operation so that the display may be used in show windows or other desirable places. When operated by power the ray member 4 on the right hand side is operated in a similar way to that of the left hand side, providing the movement and the illumination.

From the foregoing description it will be seen that I have provided means for carrying out all the objects of the invention wherein the relationship between the focal point and the retina of the eye may be seen, the type of vision at the various points may be demonstrated, and proper illumination and operating mechanism may be provided.

Having described my invention, I claim:

1. In a display device, a pivoted member having indications of a ray of light thereon, a member indicating the focal point of said ray of light and movable with the pivoted member, means concentric about the pivot of said pivoted member indicating the retina of an eye whereby the relationship of the retina and the focal point of the light will be indicated for various positions of the ray of light-indication when the said pivoted member is moved on its pivot.

2. In a display device, a pivoted member having indications of a ray of light thereon, a member indicating the focal point of said ray of light, a target spot, a spot indicating the type of vision seen when the ray of light indication points to the target spot, said target spot and vision spot lying on a straight line passing through the pivotal point of the pivoted member, the target spot lying on the light ray side of the pivoted member and the vision spot on the focal spot side of the pivoted member, a line concentric of the pivotal point indicating the retina of an eye whereby the relationship of the focal point and retina will be indicated when the indications of the ray of light point to the target spot.

3. In a display device, a pivoted member having light ray indications thereon, a line concentric about the center of the pivot representing the retina of an eye, a member indicating the focal point of the said ray of light and movable with the pivoted member, and means adapted to cause the focal point to register with the retinal line and to move away from the said retinal line as the pivot member is moved on its pivot.

4. In a display device, a pivoted member having light ray indications thereon, a line concentric about the center of the pivot representing the retina of an eye, a member indicating the focal point of the said ray of light and movable with the pivoted member, and cam means adapted to cause the focal point to register with the retinal line and to move away from the said retinal line as the pivot member is moved on its pivot.

5. In a display device, a pivoted member having light ray indications thereon, a line concentric about the center of the pivot representing the retina of an eye, a member indicating the focal point of the said ray of light and movable with the pivoted member, and means having cam slots therein adapted to cause the focal point to register with the retinal line and to move away from the said retinal line as the pivoted member is moved on its pivot.

6. In a display device, a support having a pivot opening and a cam slot therein, a member rotatably pivoted over the pivot opening and having a groove and guide therein, a member having a pointer and a projecting pin, said member being adapted to slide in the guide of the pivoted member and the pin to project into the groove and cam slot in the support, a member having an extension, means for securing the member with the extension to the rotatable member, and means to rotate the rotatable member on the pivot.

7. In a display device, a support having a pivot opening and a cam groove therein, a member pivoted over the pivot opening of the support and having slide guides thereon, a slide member having an indicator pointer and a projecting pin fitting in said slide-way and the pin projecting into the cam groove, a member on the pivoted member having a projecting extension, and means to move the pivoted member on the pivot.

8. In a display device, a pivoted member having light ray indications thereon, a line concentric about the center of the pivot representing the retina of an eye, a member indicating the focal point of the said ray of light and movable with the pivoted member, means adapted to cause the focal point to register with the retinal line and to move away from the retinal line as the pivot member is moved on its pivot, and means adapted to hold the pivoted member in certain selected positions for a definite amount of time and then move it to another selected point.

9. In a display device, a pivoted member having light ray indications thereon, a line concentric about the center of the pivot representing the retina of an eye, a member indicating the focal point of the said ray of light and movable with the pivoted member, means adapted to cause the focal point to register with the retinal line and to move away from the retinal line as the pivot member is moved on its pivot, and cam means adapted to hold the pivoted member in certain selected positions for a definite amount of time and then move it to another selected point.

10. In a display device, a pivoted member having light ray indications thereon, a target spot and a type-of-vision spot located on a straight line passing through the center of the pivoted member, and electric means adapted to illuminate the two spots when the light indications are pointing to the target spot.

11. In a display device, a pivot member having a light indication thereon, a plurality of target spots and a plurality of type-of-vision spots, said target spots and type-of-vision spots lying on lines passing through the target spots and the type-of-vision spots and the pivot of the pivoted member, means adapted to illuminate the target and type of vision spots, and switch means adapted to control the light whereby the target spot at which the light ray indication is pointing and the type of vision spot in line therewith will be illuminated.

12. In a display device in combination with a member representing an eye, a pivoted member having indications of rays of light thereon, a member movable about the pivot of the first member and also movable towards and away from said pivot and adapted to indicate the focal point of a ray of light and a member having an indication of the retina of said eye adapted to show the relationship of the retina of the eye to said focal point in various positions of the focal point.

13. In a display device having the indication of an eye, a pivoted member having indications of a ray of light thereon, a member movable about the pivot and towards and away therefrom indicating the focal point of a ray of light, a member having the indication of the retina of the eye and indicating the relationship of the retina of the eye and the focal point, and a member having a type-of-vision spot in line with the ray of light and the focal point.

14. In a display device having the indication of an eye, a pivoted member having indications of a ray of light thereon, a member movable about the pivot and towards and away therefrom and indicating the focal point of a ray of light, a member having the indication of the retina of said eye and indicating the relationship of the retina of the eye and the focal point and a target spot in line with the ray of light and the focal point.

15. In a display device having the indication of an eye, a pivoted member having indications of a ray of light thereon, a member movable about the pivot and towards and away therefrom and indicating the focal point of a ray of light, a member having the indication of the retina of the eye and indicating the relationship of the retina of the eye and the focal point, a target spot in line with a ray of light and the focal point and a type-of-vision spot in line with the target spot, the focal point and a ray of light.

16. In a display device, a member having light ray indications thereon, a member having the representation of the retina of an eye thereon, a movable member indicating the focal point of a ray of light and cam means adapted to cause the focal point to register with the representation of the retina of the eye and to move away therefrom as the focal point is moved.

17. In a display device, a member having light ray indications thereon, a member representing the retina of an eye, a movable member representing the focal point of a ray of light, means to cause the focal point to move with respect to the retina, and means adapted to hold the focal point in certain slected positions for a definite amount of time and then move it to another point.

18. In a display device having an indication of an eye, a pivoted member having light ray indications thereon, a plurality of type-of-vision spots alignable with said pivoted ray member and electric means to illuminate the type-of-vision spot aligned with the rays.

19. In a display device having the indication of an eye, a pivoted member having directional indications thereon, a plurality of target spots alignable with the directional means by movement on its pivot, and electric means adapted to illuminate the target spot aligned with the directional means and shut off the light from the spots out of alignment therewith.

20. In a display device having the indication of an eye, a pivoted member having directional indicating means thereon, a plurality of legend spots spaced from the pivoted member with which the directional means may be aligned by moving the pivoted member on its pivot, and electric means adapted to illuminate the legend spot aligned with the directional means.

21. In a display device having the indication of an eye, a pivoted member having directional indication means thereon, a plurality of legend spots spaced from each end of the pivoted member with which the directional means may be aligned by moving the pivoted member on its pivot, and electric means adapted to illuminate the legend spot in line with the directional means and to shut off the light from the spots not aligned therewith.

DANIEL DESMOND.